United States Patent [19]
Harnois et al.

[11] 3,857,430
[45] Dec. 31, 1974

[54] TIRE REMOVING APPARATUS

[76] Inventors: Paul-Emile Harnois, 76 Roy St., Notre Dame des Prairies, Quebec; Raymond Lepine, 588 Querbes St., Joliette, Quebec, both of Canada

[22] Filed: Oct. 1, 1973

[21] Appl. No.: 402,352

[52] U.S. Cl. .............................. 157/1.2, 157/1.33
[51] Int. Cl. ............................................ B60c 25/06
[58] Field of Search ......... 157/1.2, 1.24, 1.26, 1.28, 157/1.33

[56] References Cited
UNITED STATES PATENTS
| | | | |
|---|---|---|---|
| 2,513,756 | 7/1950 | Smyser | 157/1.2 |
| 2,730,166 | 1/1956 | Davidson et al. | 157/1.2 |
| 3,522,832 | 8/1970 | Held | 157/1.22 |

FOREIGN PATENTS OR APPLICATIONS
| | | | |
|---|---|---|---|
| 970,514 | 9/1964 | Great Britain | 157/1.2 |

*Primary Examiner*—Al Lawrence Smith
*Assistant Examiner*—Harold P. Smith, Jr.

[57] ABSTRACT

An apparatus for removing a tire from a rim including a bead retaining ring releasing assembly and a tire removing assembly characterized by being adapted to automatically adjust to wheels of different sizes or diameters. The apparatus comprising a wheel support having steps for wheels of different diameters, a carriage, releasing fingers movably mounted on the carriage and arranged to axially engage a bead retaining ring and release the same, tire pushing members, cam members arranged to guide the tire pushing members into automatic engagement with the side wall of a tire in relation with the size of the latter, and hydraulic actuators operating the releasing members and the tire pushing members.

7 Claims, 11 Drawing Figures

3,857,430

TIRE REMOVING APPARATUS

This invention relates to a tire removing apparatus and, more particularly, to a tire removing apparatus of the type which is adapted to operate on wheels of different sizes or diameters.

The removal of a tire from its rim includes the operations of releasing a bead of the tire and thereafter axially displacing the tire in the direction of the released bead thereof. In the case of a truck tire or the like, large forces are required and a bead retaining ring must be released. Machines or apparatuses have so far been proposed to remove tires, including truck tires, from their rims. In all known cases, the machine or apparatus must be manually set or adjusted to operate on tires of a different size or diameter. Besides, a bead retaining ring must be removed to release a bead of the tire. The existing machines are not found efficient in both of the above cases.

It is therefore a general object of the invention to provide a tire removing apparatus of the above type which automatically adjusts to operate on a tire of a different diameter.

It is another general object of the invention to provide a tire removing apparatus which is adapted for powered release of a bead retaining ring.

The above and other objects and advantages of the invention will be better understood in the light of the following detailed description of a preferred embodiment thereof which is illustrated, by way of example only, in the accompanying drawings, in which.

Figure 1:
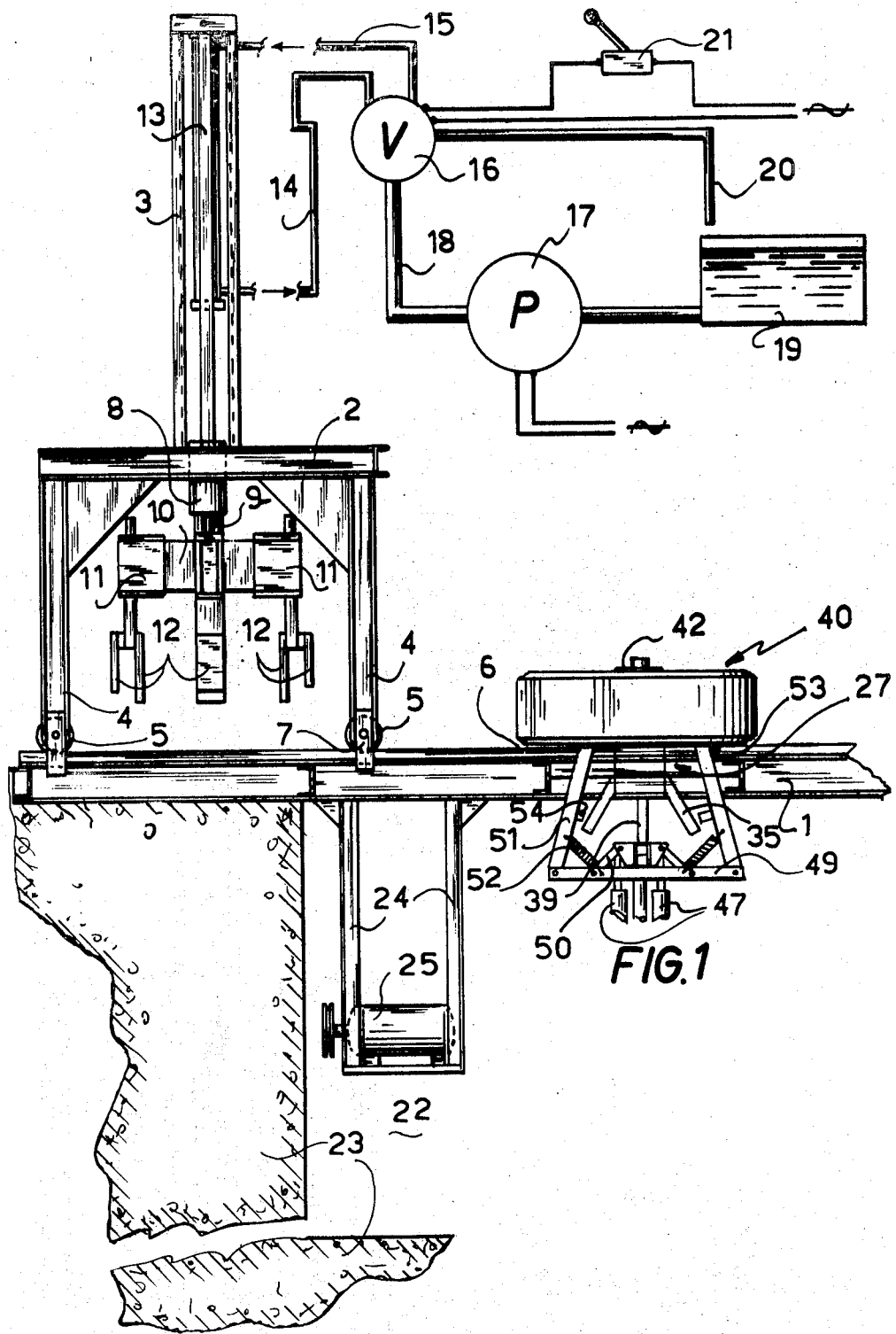
FIG. 1 is an elevation view of a releasing assembly for the bead retaining ring and wedge of a truck tire, according to the present invention.
Figure 2:
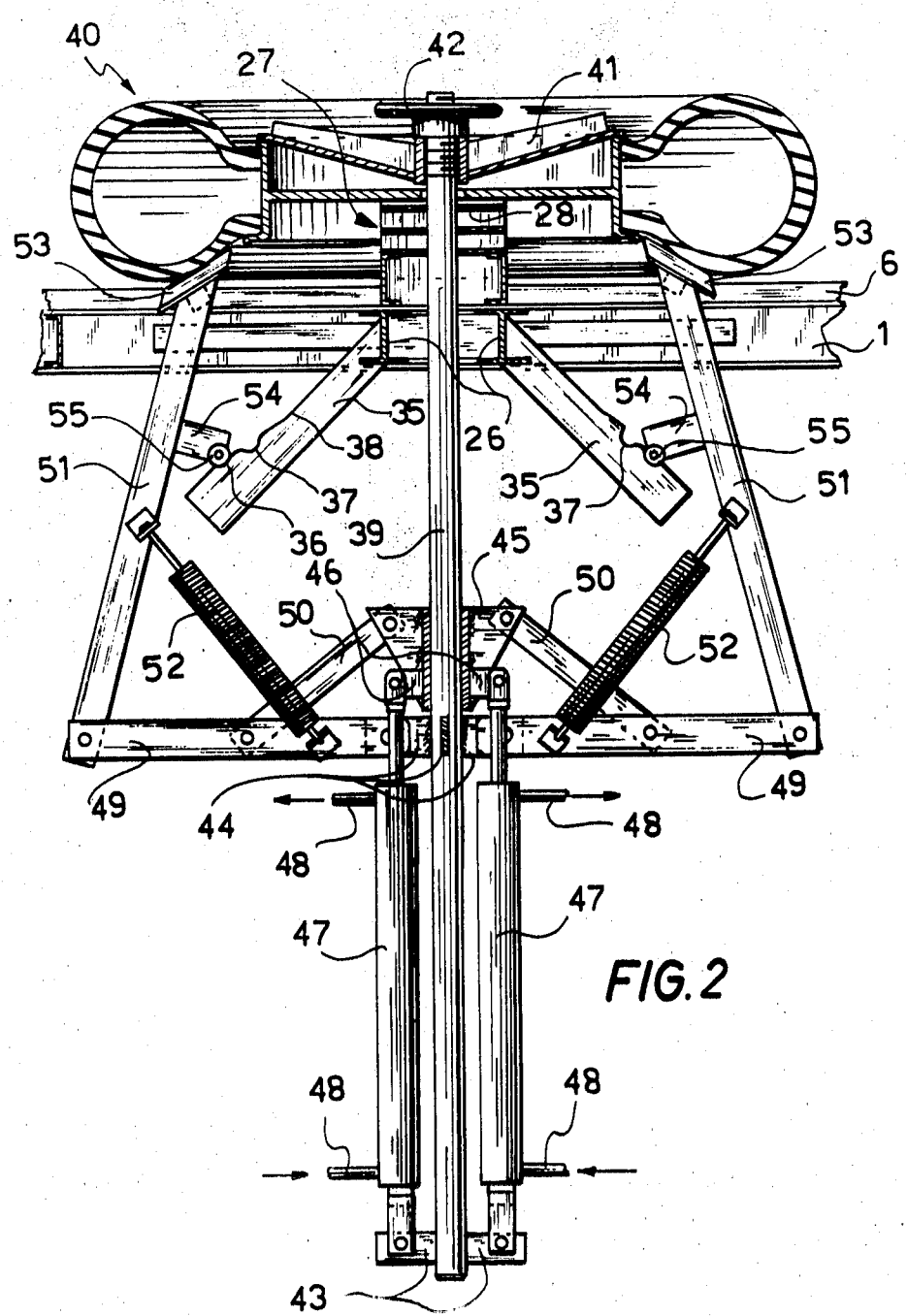
FIG. 2 is an elevation view of a tire removing assembly according to the present invention, shown as the tire pushing members just engage the tire.

The illustrated tire removing apparatus includes a releasing assembly for the bead retaining ring, which assembly is best shown in FIG. 1 mounted on a supporting platform 1 made in any suitable manner from channel-shaped metal members.

The releasing assembly includes a carriage 2 formed by a frame of metal members and including an upright extension 3. The metal frame 2 includes four legs 4 at the corners thereof. Rollers 5 are rotatably carried at the lower end of the legs 4 respectively and rotatably engage a pair of parallel tracks 6. A guiding plate 7 is secured against the outer side of each leg 4 and is curved inwardly to guidingly engage under the corresponding track 6. A sleeve 8 is secured in upright position to the metal frame 2. A post 9 is slidably mounted into the sleeve and carries cross-members 10 each having a square tube sleeve 11 radially adjustably thereon. A pair of radially spaced-apart fingers 12 are supported by each sleeve 11 for radial displacement therewith.

A hydraulic cylinder 13 is secured at its upper end to the frame extension 3 and has its piston secured to the post 9 to displace the fingers 12 up and down. Hydraulic lines 14 and 15 are connected to the opposite ends of the cylinder to cause extension and retraction of the latter under the control of a valve 16 which is fed with hydraulic fluid by a pump 17 inserted into a fluid line 18 connected to a hydraulic fluid reservoir 19. An overflow pipe 20 extends from the valve 16 to the reservoir 19. A switch 21, of any suitable type, is connected to the valve 16 to selectively actuate the latter.

The platform 1 preferably extends over a pit 22 formed by concrete 23 into the floor of a garage or shop 9. Metal bracket or support 24 is secured to the platform 1 and depends therefrom supporting a motor 25 to drive the pump 17.

Figure 6:
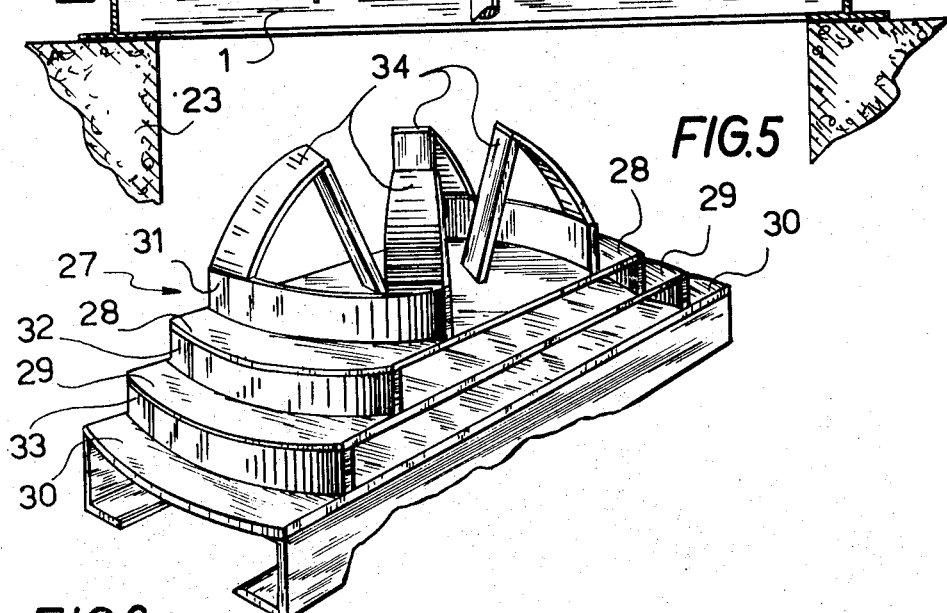
FIG. 6 is a perspective view of a wheel support adapted to hold a wheel of any of different sizes.
Figure 7:
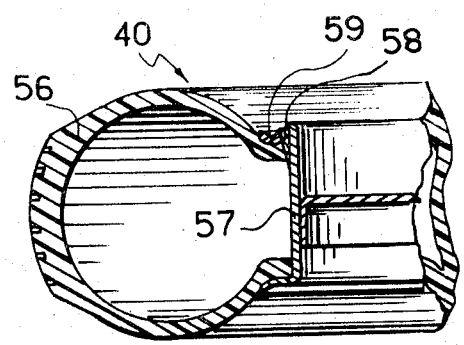
FIG. 7 is a partial cross-sectional view through a truck wheel along line 7—7 in FIG. 9.
Figure 8:
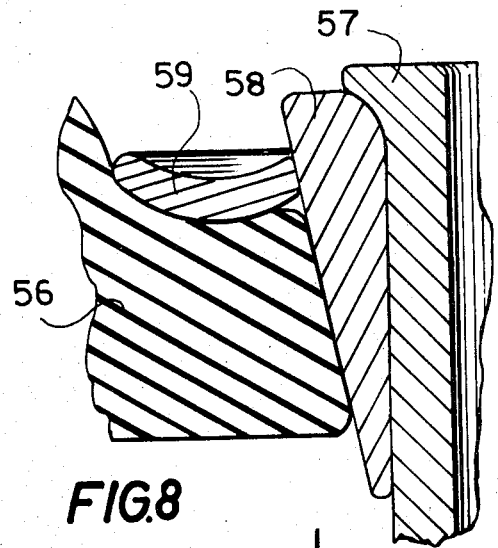
FIG. 8 is an enlarged detailed view of FIG. 7 showing the bead retaining ring and wedge in operative position.
Figure 9:
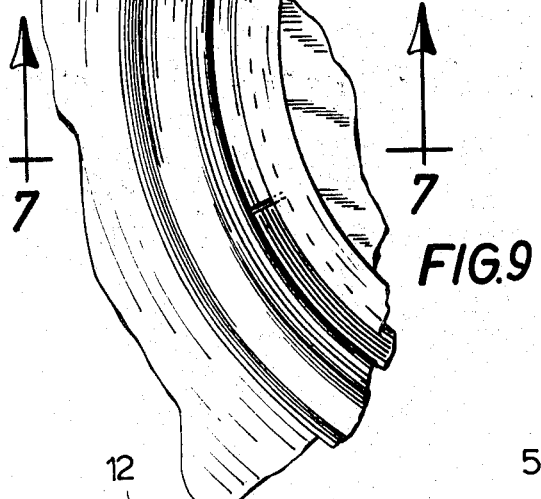
FIG. 9 is a partial plan view of a truck wheel.

A pair of I-beams 26 extend parallel to each other transversely of the platform 1. A wheel support 27 is secured to the platform 1 over the I-beams 26. The wheel support 27, as best shown in FIG. 6, includes three steps 28, 29, and 30 limited by pairs of arc-shaped members 31, 32, and 33 of gradually increasing diameters to support a wheel of any of three predetermined diameters or sizes. Centering curved blades 34 are mounted onto the wheel support 27 and extend outwardly into engagement with the arc-shaped members 31.

A set of four elongated cam members 35 are secured at their upper end to the I-beams 26 of the platform 1 and converge radially and axially towards the wheel support 27. Each elongated cam member 35 has a cam surface formed by a pair of notches 36 and 37 and a narrower portion 38.

A central post or rod 39 is rigidly secured relative to the wheel support 27 and the platform 1, such as by welding, to the latter. The central post 39 extends upwardly through the wheel support and a wheel 40 resting onto the latter. A spider 41 is inserted around the upper end of the post 39 and a nut 42 is screwed onto the threaded end of the post and tightens the wheel 40 against the appropriate step 28, 29 or 30 of the wheel support 27.

A pair of ears 43 are secured to the lower end of the central post 39 and extend in diametrically opposite directions therefrom. A set of four ears 44 are secured to the central post 39 intermediate the ends thereof and extend radially outwardly from the latter at substantially 90 degrees from one another around the post. An actuation member 45 is slidably mounted onto the post 39 and forms a set of four lugs or ears extending radially from the post and at substantially 90 degrees one to another.

A pair of diametrically opposite lugs 46 extend diagonally intermediate the ears of the connecting member 45. A pair of hydraulic cylinders 47 are connected between the ears 43 and the lugs 46 and are arranged to produce to and fro sliding of the connecting member 45 along the post or rod 39 by feeding hydraulic fluid in the appropriate direction through the fluid lines 48.

A linkage is provided to upwardly push a tire off its rim and includes a set of four radially extending levers 49, each pivoted at one end to one of the four ears 44. A rigid link 50 pivotally joins each radial lever 49 to a corresponding ear of the connecting member 45. Four pushing rods 51 are pivoted to the outer end of the radially extending lever 49 respectively and a spring 52 pulls the upper end of each rod 51 towards the post 39. A tire pushing plate 53 is rigidly secured to the free end of each pushing rod 51 to form a tire pushing member therewith and is inclined axially inwardly towards the threaded end of the post 39. A cam follower bar portion 54 is secured to each pushing rod 51 and extends radially inwardly relative thereto. A roller 55 is rotatably mounted onto each bar portion 54 and arranged to rollably engage the corresponding cam surface of the adjacent cam member 35 under the bias of the associated tension spring 52.

The tire removing apparatus according to the present invention is adapted to remove different types of tires but, more particularly, a truck tire 56 from its rim 57, the wheel 40 of which also includes a wedging ring 58 and a bead retaining ring 59.

Figure 4:
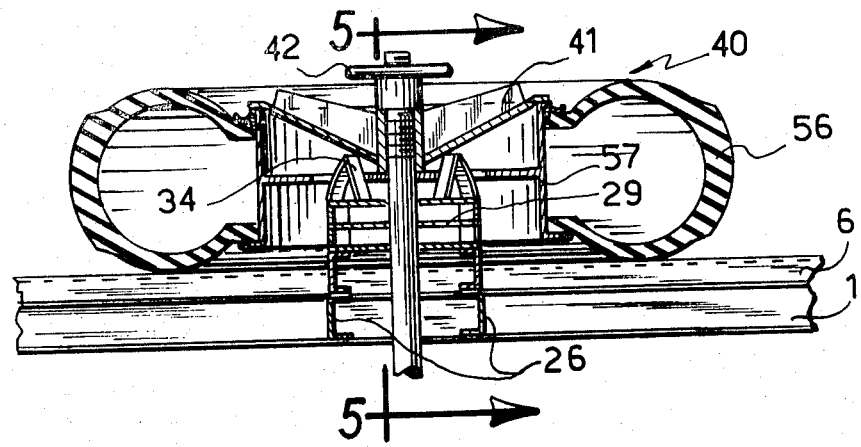
FIG. 4 is a cross-sectional view through a wheel held in operative position to remove the tire thereof.
Figure 5:
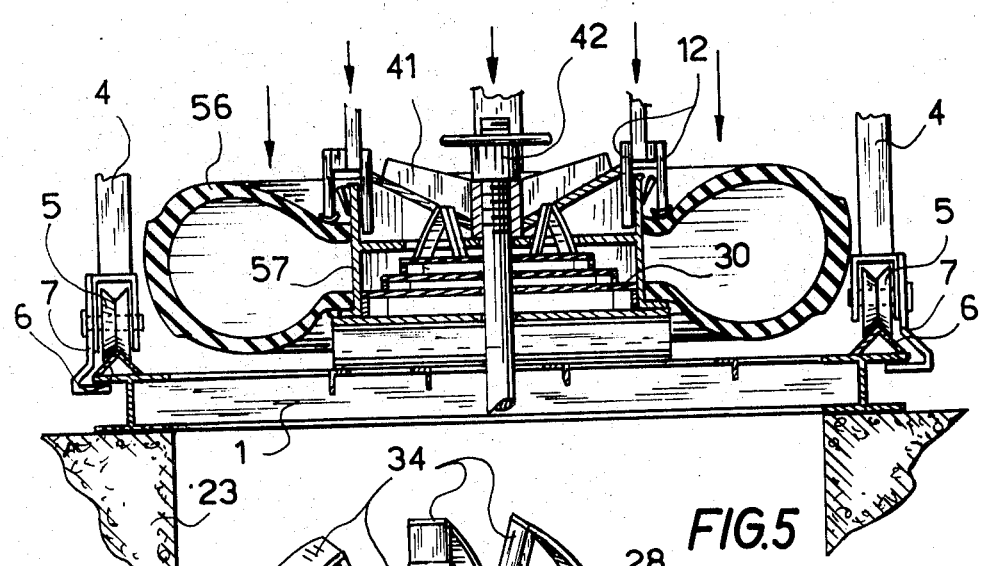
FIG. 5 is a cross-sectional view as seen along line 5—5 in FIG. 4 with a retaining ring releasing assembly in cooperation therewith.
Figure 10:
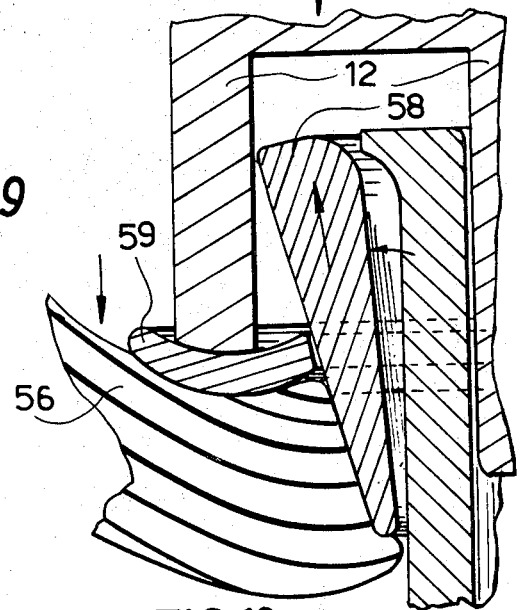
FIGS. 10 and 11 are sequential views, similar to FIG. 8, but illustrating the release of the bead retaining ring and wedge of a truck wheel.
Figure 11:
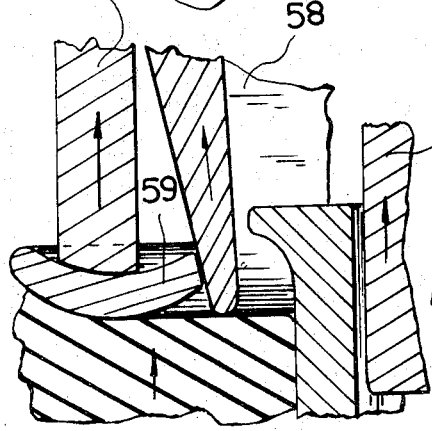

To remove a truck tire 56, the truck wheel 40 is secured onto the appropriate step 28, 29 or 30, depending on the size of the wheel. The spider member 41 and the nut 42 are then tightened to clamp the rim 57 onto the wheel support 27, as shown in FIG. 4. The carriage 2 is then rolled to cause the cruciform frame 10 and the depending fingers 12 to overlie the wheel 40. The fingers 12 may then be adjusted radially along the radial arms of the frame 10, such that upon lowering thereof, they engage opposite sides of the rim 57, as shown in FIGS. 5, 10, and 11. The bead retaining ring 59 is thus lowered and frees the wedge 58. After retraction of the fingers 12, both rings 58 and 59 may be removed.

Figure 3:
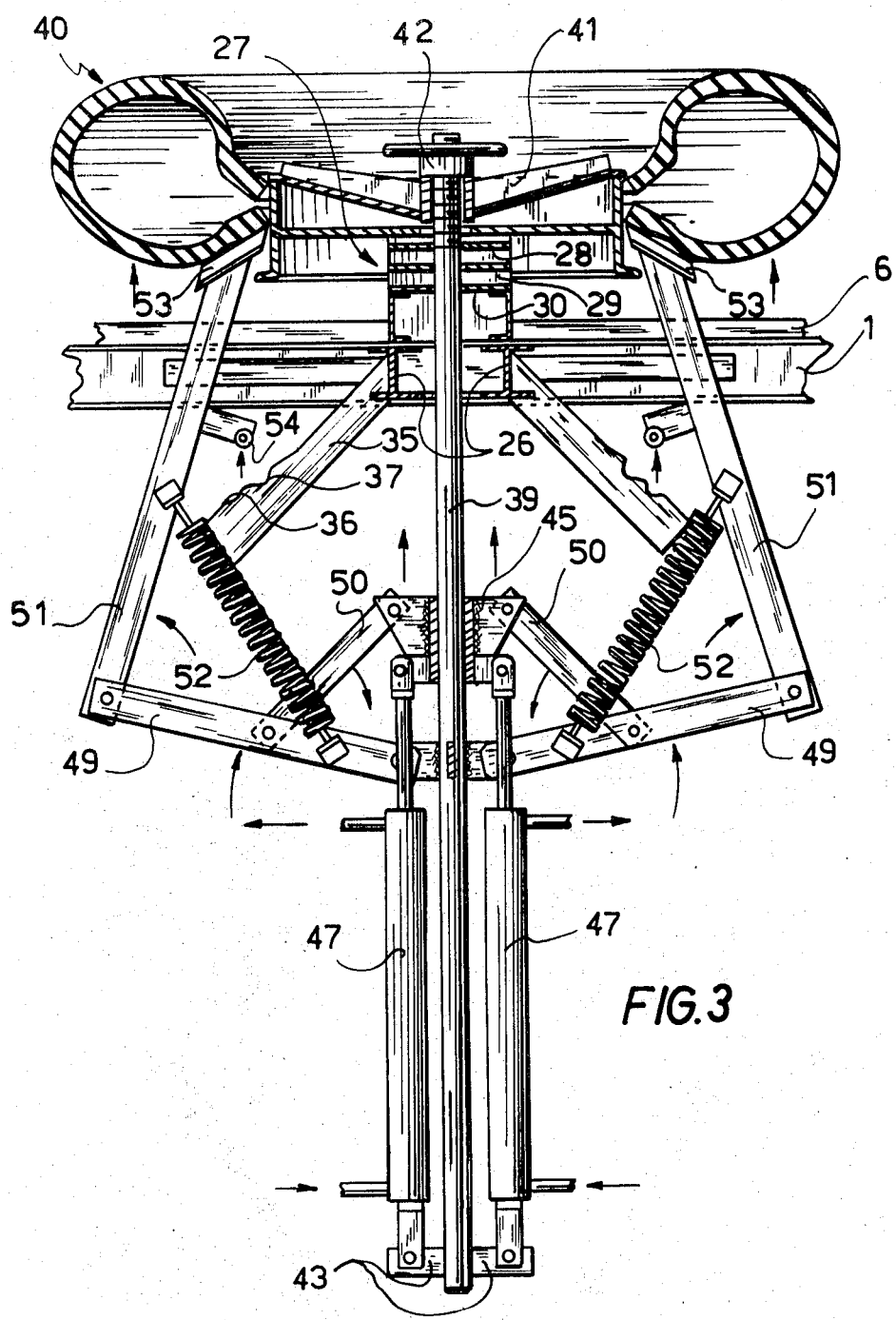
FIG. 3 is a view similar to FIG. 2 but with the tire pushing members displaced to start the removal of a tire.

The actuators 47 are thereafter actuated to cause upward displacement of the connecting member 45 with the associated displacements indicated by the arrows in FIG. 3. The rollers 55 engage into notches 36 and cause the plates 53 to engage the side wall of a larger size tire. When a tire and rim of medium size are involved, the rollers 55 roll farther upward and engage the notches 37 before engagement of the plates 53, since such rim rests onto the higher, intermediate step 29 of the wheel support 27. Similarly, when the wheel is of the smaller size which rests on the highest step 28, the rollers 55 travel still farther along the cam surfaces until engagement with the reduced portion 38 of the cam members 35. Then, the pushing plates 53 are biased inwardly closer to the post 39 and still engages the side wall of the tire involved. Thereafter, the plates 53 slide along the outer surface of the rim 57 until disengagement of the tire from the latter.

As will be understood by anyone skilled in the art, many changes in the details of construction are possible without departing from the principles and scope of the invention defined by the appended claims.

We claim:

1. A tire removing apparatus operatively comprising, in combination, a fixed post, a wheel support fixedly mounted relative to and around said post and including fixedly spaced-apart wheel rests of graded sizes gradually decreasing toward one end of said post, an actuation device reciprocatively displaceable along said post toward and away from said wheel support, tire pushing members, each having a tire engaging portion engageable with the side wall of the tire of a wheel mounted on one of said rests, linkage assemblies pivotally connecting said tire pushing members respectively to said actuation device and to said post, camming elements fixedly secured relative to said wheel support and said post, and means engaging said tire pushing members and biasing the latter toward cam following engagement with said camming elements respectively.

2. A tire removing apparatus as defined in claim 1, wherein each of said camming elements constitutes a member forming a cam face extending radially inwardly and axially towards said wheel support and said tire pushing members include each a cam follower portion engageable with the cam face of a corresponding one of said cam members.

3. A tire removing apparatus as defined in claim 1, wherein each of said linkage assemblies includes a lever pivoted at one end to said rod and projecting radially from the latter and a rigid link pivotally joining the corresponding lever to said actuation device, and said biasing means includes a spring connecting each of said levers to the corresponding tire pushing member.

4. A tire removing apparatus as defined in claim 3, wherein said wheel support includes different steps forming said wheel rests of graded sizes adapted to carry wheels of different diameters respectively, and said camming elements include rigid arms axially converging towards said wheel support and forming cam surfaces with notches therealong arranged for engagement by said tire pushing members and engagement of the latter with the tire of any of said wheels of different diameters.

5. A tire removing apparatus as defined in claim 4, further including hydraulic cylinders extending along said rod and secured at one end to the latter, and at the other end to said actuation device to produce to and fro displacement of the latter along said rod.

6. A tire removing apparatus as defined in claim 5, wherein each of said tire engaging portions constitutes a plate inclined inwardly and axially towards said one end of said rod.

7. A tire removing apparatus as defined in claim 6, further including a carriage rollably arranged to travel to and fro relative to said wheel support means, a frame movably mounted onto said carriage and arranged for axial displacement relative to a wheel mounted onto said wheel support means, releasing fingers supported by said frame and arranged to axially engage a bead retaining ring, said releasing fingers being radially adjustable relative to said wheel to operatively engage a wheel of any of said predetermined sizes, and a hydraulic actuator engaging said frame and arranged to displace the latter and said releasing fingers to and fro axially relative to said bead retaining ring.

* * * * *